United States Patent [19]

Allen et al.

[11] Patent Number: 4,857,390
[45] Date of Patent: Aug. 15, 1989

[54] LOW DENSITY EXTRUDED FOAM HAVING HIGH COMPRESSIVE STRENGTH

[75] Inventors: Richard B. Allen, Pittsfield, Mass.; Barbara M. Bacskai, Shaumburg, Ill.; Daniel L. Roberts, Albany; Richard C. Bopp, West Coxsackie, both of N.Y.

[73] Assignee: General Electric Company, Pittsfield, Mass.

[21] Appl. No.: 67,556

[22] Filed: Jun. 26, 1987

[51] Int. Cl.$^4$ .......................... B32B 5/20; B29C 67/22; C08J 9/14

[52] U.S. Cl. ...................... 428/220; 264/53; 264/DIG. 5; 428/332; 521/139; 521/180; 521/182; 521/184; 521/189

[58] Field of Search .................. 264/53; 428/220, 332; 521/139, 180, 182, 184, 189

[56] References Cited

U.S. PATENT DOCUMENTS

| | | |
|---|---|---|
| 3,151,192 | 9/1964 | Jacobs et al. |
| 3,306,874 | 2/1967 | Hay . |
| 3,306,875 | 2/1967 | Hay . |
| 3,431,164 | 3/1969 | Gilbert . |
| 4,454,087 | 6/1984 | Hayashi et al. . |
| 4,579,710 | 4/1986 | Krutchen et al. ............. 264/53 X |
| 4,579,873 | 4/1986 | Krutchen et al. ............. 264/53 X |
| 4,579,874 | 4/1986 | Krutchen et al. ............. 264/53 X |
| 4,579,878 | 4/1986 | Krutchen et al. ............. 264/53 X |
| 4,587,271 | 5/1986 | Krutchen et al. ............. 264/53 X |
| 4,594,208 | 6/1986 | Krutchen et al. ................ 264/53 |
| 4,598,100 | 7/1986 | Krutchen et al. ............. 264/53 X |
| 4,598,101 | 7/1986 | Krutchen et al. ............. 264/53 X |
| 4,598,104 | 7/1986 | Krutchen et al. . |
| 4,661,302 | 4/1987 | Park .......................... 264/53 |
| 4,705,811 | 11/1987 | Park ....................... 264/53 X |
| 4,734,441 | 3/1988 | Park ....................... 264/53 X |

FOREIGN PATENT DOCUMENTS

| | | |
|---|---|---|
| 135652 | 8/1962 | Fed. Rep. of Germany . |
| 251937 | 6/1979 | Fed. Rep. of Germany . |
| 1479292 | 6/1974 | United Kingdom . |

OTHER PUBLICATIONS

Schrafft, Fred, "Extruding Thermoplastic Foams", Modern Plastics Encyclopedia, 1982–1983, pp. 274–275.

*Primary Examiner*—Philip Anderson
*Attorney, Agent, or Firm*—Hedman, Gibson, Costigan & Hoare

[57] ABSTRACT

A low density extruded structural foam of closed cell structure having good compressive strength comprising a engineered thermoplastic resin, alone, or containing a flame retarding agent and/or nucleating agent, optionally combined with a vinyl aromatic resin, and a blowing agent is produced by feeding said resin, or composition, into a primary extruder wherein mixing, adding a blowing agent which is essentially insoluble in the resin at room temperature but soluble in the melt and further mixing, then optionally passing the mixture to a second, cooling extruder, passing said extruded mixture through a die, then expanding and foaming said composition into a foam article.

23 Claims, 1 Drawing Sheet

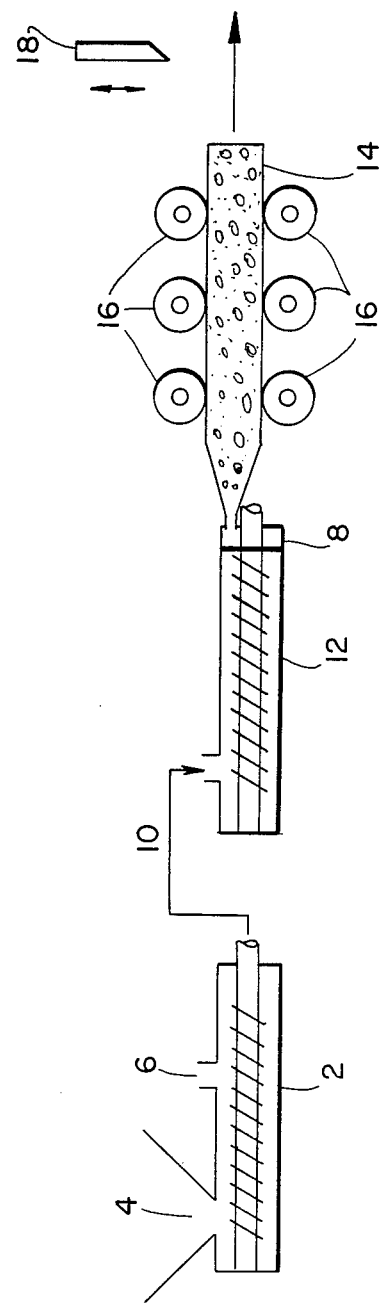

LOW DENSITY EXTRUDED FOAM HAVING HIGH COMPRESSIVE STRENGTH

FIELD OF THE INVENTION

The present invention relates to a structural low density foam extrusion having closed cell structure and high compressive strength.

BACKGROUND OF THE INVENTION

Foam extrusion technology is well known in the art. Traditional expanded polystyrene technology has existed since the early 1950's. Uses for low density foam extrusions include foam insulation and food packaging.

Presently, tandem extruders are typically used in the production of extruded foam boards or rods. The first extruder is for melting and mixing the blowing agent. The second extruder is for cooling the melt. See, for example, Modern Plastics Encyclopedia, 1982-1983, pp. 274-275. Such technology works well with commodity thermoplastics, e.g., polystyrene, but for engineered thermoplastic, the high viscosity in the melt precludes free translation of the processing parameters, especially extrusion temperatures and pressures.

Limitations in the use of polystyrene for the manufacture of foam extrusion have been found to include poor temperature stability and low compressive strength when low densities are used, due in part to large cell size and poor orientation. Increased compressive strength is an important feature especially for foam insulation because it is often the physical property of the product which prohibits lowering the density of the foam even further to reduce material costs.

Although many foamed articles comprising engineering thermoplastics, such as polycarbonates, polyesters, polysulfones, polyphenylene ethers, as well as compositions with other thermoplastics, such as polystyrenes are known, it is not generally possible to readily produce closed foamed structures easily from them, especially at densities of about 20 lbs./cu. ft. and particularly with compressive strengths above about 20 psi. Krutchen et al, U.S. Pat. Nos. 4,598,101 and 4,598,104, deal with foamable compositions of polyphenylene ethers and high impact rubber modified styrenes. Only a specific narrow class of blowing agent were used, namely, liquid chlorinated hydrocarbons. One example, methylene chloride is found to form an insoluble complex with polyphenylene ether at room temperature. These have the drawback of not producing optimum foams apparently because they act as solvents for the resins both at room temperature and at the elevated temperatures employed in the extruders. In addition, the blowing agents used by Krutchen et al are believed not to be suitable for expanding resin mixtures containing crystal polystyrene.

A need therefore, continues to exist to produce articles from engineered thermoplastics with compressive strengths above about 20 psi and especially above about 50 psi to about even above 100 psi, and methods to make such, and the foamed articles themselves have now been discovered and are the subject matter of this invention. It is important in securing these results to use a blowing agent which is essentially insoluble in the resin at room temperature but soluble at elevated processing temperatures, such as a hydrocarbon or a chlorofluorocarbon.

It is therefore an object of the present invention to provide low density extrusion foam product with closed cell structure and high compressive strength.

It is a further object of the present invention to provide flame retardant embodiments of such foams.

SUMMARY OF THE INVENTION

According to this invention there are provided low density, high compressive strength extruded structural foamed articles comprising an engineering thermoplastic resin, alone, or combined with an alkenyl aromatic polymer having closed cell structure produced by the steps comprising:

(a) feeding the resin composition into an extruder;
(b) melting and mixing the resin;
(c) introducing a blowing agent which is essentially insoluble in the resin at room temperature but soluble at elevated temperatures into said extruder;
(d) mixing the blowing agent with the resin in said extruder;
(e) cooling the mixture, optionally in a second extruder; and
(f) foaming the mixture through a die.

In preferred features of the invention, a polyphenylene ether/crystal polystyrene (PPE/PS) resin is the thermoplastic resin composition of choice. Typical blowing agents are hydrocarbons, chlorofluorocarbons, and the like. The blowing agent need only be soluble at melt temperatures and pressures but insoluble at ambient pressures and die temperatures. Flame retardant additives can be introduced in the first extruder.

Preferably, two extruders are used, a primary mixing-cooling extruder and a second cooling extruder which combine to produce a foamable composition which exits the die attached to the cooling extruder.

The preferred article manufactured as the product of this invention is a foam insulation board or a thermoformable foam sheet. This can preferably contain flame retarding agents, added during extrusion, to provide fire retardancy to the foam.

The low density foam produced by the present invention finds novelty in the fact that high compressive strengths, e.g., greater than 20 psi, and even greater than 50 psi are achieved even at low densities, e.g., below about 20 lb./ cu. ft., especially below about 5 lb./cu. ft.

DETAILED DESCRIPTION OF THE INVENTION

In reference to the FIGURE, the present invention relates to a low density foam extrusion product 14 with essentially closed cell structure and high compressive strength produced by adding a suitable thermoplastic engineering resin or composition with an alkenyl aromatic polymer to a mixing-cooling extruder 2 and heating to melt, injecting a blowing agent into said melt in the extruder 2, optionally passing the mixture to a second cooling extruder 12, and passing said mixture through a die 8.

The resin or resin composition is added to the extruder 2 through an input opening 4. The blowing agent is introduced to the extruder 2 through a blowing agent injector 6 to form a mixture of resin and blowing agent. The mixture can then be passed through a die 8 and foamed or, optionally, passed through a closed conveyor 10 and into a second cooling extruder 12 before being passed through the die 8 for expansion. Once passed through the die 8, the mixture expands to a foamed article 14 and is carried away from the die 8 on a belt, through rollers 16, or on a mandrel before being cut to length by a knife 18 located downstream of the rollers 16.

The term thermoplastic engineering resins includes resins with superior properties, especially mechanical strength and toughness, and typically embraces polyphenylene ethers, aromatic polycarbonates, polyesters, polysulfones, polyamides, alone or combined or in further combination with alkenyl aromatic polymers.

The polyphenylene ether (PPE) resin is normally a homopolymer or copolymer having units of the formula

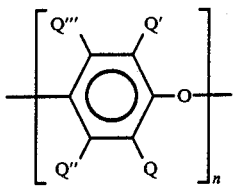

wherein Q, Q', Q'', and Q''' are independently selected from the group consisting of hydrogen, halogen, hydrocarbon, halohydrocarbon, hydrocarbonoxy, and halohydrocarbonoxy; and n represents the total number of monomer units and is an integer of at least about 20, and more usually at least 50.

The polyphenylene ether resin can be prepared in accordance with known procedures, such as those described in U.S. Pat. Nos. 3,306,874 to Hay and 3,306,875, to Stamatoff from the reaction of the phenols including but not limited to:
2,6-dimethylphenol; 2,6-diethylphenol; 2,6-dibutylphenol;
2,6-diaurylphenol; 2,6-dipropylphenol; 2,6-diphenylphenol;
2,6-methyl-6-tolylphenol; 2-methoxyphenol;
2,3,6-trimethylphenol; 2,3,5,6-tetramethylphenol, and 2,6-diethyoxyphenol.

Each of these may be reacted alone to produce the corresponding homopolymer, or in pairs or with still other phenols to produce the corresponding copolymer. Examples of the homopolymers include
poly(2,6-dimethyl-1,4-phenylene ether),
poly(2,6-diethyl-1,4-phenylene ether),
poly(2,6-butyl-1,4-phenylene ether),
poly(2,6-diauryl-1,4-phenylene ether),
poly(2,6-dipropyl-1,4-phenylene ether),
poly(2,6-diphenyl-1,4-phenylene ether),
poly(2-methyl-6-tolyl-1,4-phenylene ether),
poly(2-methyl-6-methoxy-1,4-phenylene ether),
poly(2-methyl-6-butyl-1,4-phenylene ether),
poly(2,6-dimethoxy-1,4-phenylene ether),
poly(2,3,6-trimethyl-1,4-phenylene ether),
poly(2,3,5,6-tetramethyl-1,4-phenylene ether), and
poly(2,3,5,6-tetramethyl-1,40-phenylene ether), and
poly(2,6-diethyoxy-1,4-phenylene ether).
Examples of the copolymer include especially those of 2,6-dimethylphenol with other phenols, such as poly(2,6-dimethyl-co-2,3,6-trimethyl 1,4-phenylene ether) and poly(2,6-dimethyl-co-2,methyl-6-butyl-1,4-phenylene ether).

For purposes of the present invention, an especially preferred family of polyphenylene ethers include those having alkyl substitution in the two positions ortho to the oxygen ether atom, i.e., those of the above formula Q and Q' are alkyl, most preferably having from 1 to 4 carbon atoms. Illustrative members of the class are:
poly(2,6-dimethyl-1,4-phenylene)ether;
poly(2,6-diethyl-1,4-phenylene)ether;
poly(2-methyl-6-ethyl-1,4-phenylene)ether;
poly(2-methyl-6-propyl-1,4-phenylene)ether;
poly(2,6-dipropyl-1,4-phenylene)ether;
poly(2-ethyl-6-propyl-1,4-phenylene)ether; and the like.

The most preferred polyphenylene ether resin for purposes of the present invention is poly(2,6-methyl-1,4-phenylene)ether.

The thermoplastic engineering resin can be used alone or in combination with an alkenyl aromatic polymer. The term "alkenyl aromatic polymer" as it is employed in this disclosure is intended to encompass homopolymers as well as copolymers and terpolymers of alkenyl aromatic compounds with one or more other materials. Preferably, the alkenyl aromatic polymer is based at least in part on units of the formula

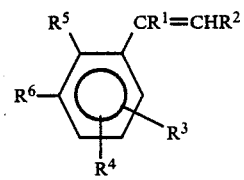

wherein $R^1$ and $R^2$ are selected from the group consisting of lower alkyl or alkenyl groups of from 1 to 6 carbon atoms and hydrogen; $R^3$ and $R^4$ are selected from the group consisting of chloro, bromo, hydrogen, and lower alkyl of from 1 to 6 carbon atoms; $R^5$ and $R^6$ are selected from the group consisting of hydrogen and lower alkyl and alkenyl groups of from 1 to 6 carbon atoms; or $R^5$ or $R^6$ may be concatenated together with hydrocarbyl groups to form a naphthyl group.

The above will encompass styrene, as well as homologs and analogs of styrene. Specific examples include, in addition to styrene, chlorostyrene, bromostyrene, alphamethyl styrene, para-methyl styrene, vinyl styrene, divinylbenzene and vinyl naphthalene. Crystal polystyrene is especially preferred.

Polyphenylene ether resins and polystyrene resins are combinable in all proportions, e.g., from about 1 to 99 to about 99 to about 1 parts by weight. It is contemplated, however, that low density compositions of the present invention are comprised of at least 2 weight percent PPE (based upon the weight of PPE and PS taken together). Compositions containing less than 2 weight percent PPE are considered to be primarily polystyrene compositions and do not generally exhibit the preferred property improvements associated with PPE/PS blends. It is well known that the addition of PPE to polystyrene blends offers improvements in impact strength, flammability ratings, tensile strength and other mechanical properties. Conversely, polystyrene is typically blended with polyphenylene ether resins to offer better processability for many thermoplastic processes.

Typical PPE/PS blends useful in the practice of the present invention will be comprised of between 10 to 90 percent and preferably 20 to 80 percent by weight PPE and 90 to 10 percent PS based upon the weight of the two resins taken together. It is contemplated, however, that the process of the present invention may be practiced for resin systems having up to one hundred percent PPE resin thereby providing low density PPE particles not heretofore available.

The resin, or composition, is fed into a mixing-cooling single or twin-screw type extruder 2 and melted and mixed therein with sufficient temperature and shear to provide an intimate blend.

During the blending step it is contemplated that conventional additives may be incorporated in the resin mixture if desired. These include flame retarding agents, stabilizers for thermal and color stability, antioxidants, processing aids and plasticizers, reinforcing and extending fillers, pigments and the like. Each of these may be utilized to a greater or lesser degree depending on the required final properties desired in the low density foam product. Conventional surfactants and nucleants used in expanded polystyrene foams may also be utilized. Examples of these include zinc or tin stearates, maleates, fumarate and the like.

The present invention preferably contemplates a flame retardant product produced by the addition of flame retarding agents or additives.

Low density foams comprised of blends of PPE resin and polystyrene have been found to exhibit improved fire retardancy over polystyrene foam. Further aromatic improvements are expected in the flame retardant character of these foams using organophosphates, brominated aromatic compounds (with and without antimony synergists), hydrated alumina and their combinations. Representative examples of organophosphate include triphenylphosphate and isopropyltriphenylphosphate. Respresentative examples of brominated aromatic compounds include brominated diphenyl ethers, brominated polystyrene, brominated polycarbonate, tris(2,4-dibromophenyl) phosphate, and tetrabromodicoctyl phthalate, brominated polyphenylene ether, and the like.

These flame retardant additives improve the flame retardancy of low density PPE/PS foams over a range of compositions. Organophosphate loadings yielding from 0.1 to 1.5% phosphorous and especially 0.1 to 0.5% phosphorous are preferred. Preferred flame retardant compositions prepared with brominated aromatic compounds contain from 0.1 to 5% bromine and most preferably from 0.2 to 2% bromine. Preferred synergistic combinations include bromine and antimony compounds, e.g., antimony oxide, having a bromine-to-antimony ratio ranging from 2–4 to 1, most preferably 3 to 1. Hydrated alumina loadings should be less than 20% by weight. About ⅜ downstream on the length of the extruder 2, a blowing agent is introduced under pressure into the resin melt through a blowing agent injector 6 and then mixed in the extruder 2 to form a melt mixture.

Suitable blowing agents should include conventional hydrocarbon or chlorofluorocarbon blowing agents. Chlorocarbon blowing agents, such as methylene chloride, should not be used. Hydrocarbon agents will include aliphatic hydrocarbons, especially those having 4 to 7 carbon atoms. Examples of hydrocarbons include pentane, isopentane, pentene, hexane, heptane, butane and the like. Chlorofluorocarbon blowing agents include $CCl_3F$, $CCl_2F_2$, $CCl_2F_2$, $C_2Cl_3F_3$, $C_2ClF_5$, $CHClF_2$ and $CClF_2-CClF_2$. These are commercially available as Freon® 11, Freon® 12, Freon® 22, Freon® 113, Freon® 115 and Freon® 114.

Once extruded and mixed with blowing agent in the primary extruder 2 the mixture can be cooled, passed through a die 8 and expanded, or foamed. The cooling step can take place either in the primary extruder 2 or in a second cooling extruder 12.

When a second, cooling extruder 12 is used, the mixture is moved from the primary extruder 2 to the secondary extruder 12 through a pressurized closed conveyor 10. The closed conveyor 10 is also heated to maintain consistency of the melt mixture throughout the process. When a second extruder 12 is used, the die 8 is attached to the extruder 12.

Proper temperatures must be maintained throughout the process to ensure cell structure and skin formation.

The die 8 can be manufactured to produce a product of rod, board or annular sheet design. As the mixture exits the die 8 expansion, or foaming occurs and the foam 14 is pulled or stretched from the die 8 over a belt, for rod, through rollers 16 for board or in the case of sheet, a mandrel. The foam 14 can then be cut by a knife 18 located downstream, and rolled onto winders.

Although typical PPE/PS structural foam exhibits densities in excess of 50 lb./cu. ft., such injection moldable foamed materials are quite distinct from the PPE/PS compositions of the present invention which exhibit densities less than 20 lb./ft$^3$. Furthermore, the present invention provides PPE based foams which can have densities of less than 3.0 lb./ft.$^3$.

Cell structure of the foam 14 can be achieved at 95% and more closed cell and of relatively small cell size. The cell size of the foam produced herein is typically in the range of 0.1 to 0.5 mm.

Even with the low density achievable through the present invention, compressive strength can be maintained above about 20 psi preferably above about 50 psi, thus maximizing material cost effectiveness.

One primary use envisioned for the low density PPE/PS foam of the present invention is the production of flame resistant foam insulation board having a thickness of 40–60 mm.

DESCRIPTION OF THE PREFERRED EMBODIMENT

The following examples are intended solely for illustration and are not to limit the invention described in the appended claims in any way.

EXAMPLE 1

Pelletized 0.46 IV poly(2,6-dimethyl-1,4-phenylene ether) (PPE) nucleated with 0.5% talc is foamed in a twin-screw extruder injecting chlorofluorocarbon 12 as a blowing agent under the following temperature conditions:

| | |
|---|---|
| Zone 1 | 400 degrees F. |
| Zone 2 | 500 " |
| Zone 3 | 500 " |
| Zone 4 | 400 " |
| Gate | 500 " |
| Die | 475 " |

Foam density is about 6 lb./cu. ft. The cell structure is closed and good. The heat deflection temperature is 192° C. measured by dynamic modulus curve.

EXAMPLE 2

A 30/70 weight/weight blend of 0.40 dl/g PPE/polystyrene homopolymer is run with 0.75% talc nucleator and chlorofluorocarbon 12 blowing agent at the following temperatures:

| | |
|---|---|
| Zone 1 | 300 degrees F. |
| Zone 2 | 400 " |
| Zone 3 | 450 " |
| Zone 4 | 300 " |
| Gate | 400 " |
| Die | 315 " |

Density is about 8 lb./cu. ft. with good closed cell structure and a good skin.

EXAMPLE 3

A 30/70 weight/weight blend of PPE/extrusion grade crystal polystyrene is run in a tandem extruder with 0.5% talc and chlorofluorocarbon 12 blowing agent at the following temperatures:

| | |
|---|---|
| Zone 1 | 360 degrees F. |
| Zone 2 | 428 " |
| Zone 3 | 459 " |
| Coupling Zone | 360 " |
| Zone 5 | 290 " |
| Zone 6 | 315 " |
| Die | 309 " |

This material expands to about 7/8" from a 0.150" rod die.

EXAMPLE 4

A 30/70 blend of PPO/injection grade polystyrene is run in a tandem extruder process with 0.5% talc and fluorocarbon 12 blowing agent at the following temperatures:

| | |
|---|---|
| Zone 1 | 370 degrees F. |
| Zone 2 | 445 " |
| Zone 3 | 470 " |
| Coupling Zone | 364 " |
| Zone 5 | 300 " |
| Zone 6 | 330 " |
| Die | 318 " |

This material expands to about 7/8" from a rod die of 0.150".

EXAMPLE 5

A composition comprising poly(2,6-dimethyl-1,4-phenylene ether) and high impact rubber modified polystyrene (NORYL ® FN215) is run with 0.5% talc and chlorofluorocarbon 12 blowing agent in a tandem exruded process at the following temperatures:

| | |
|---|---|
| Zone 1 | 353 degrees F. |
| Zone 2 | 435 " |
| Zone 3 | 465 " |
| Coupling Zone | 370 " |
| Zone 5 | 288 " |
| Zone 6 | 300 " |
| Die | 298 " |

Good foam is produced following an exampsion to approximately ⅞" from a 0.150" die.

EXAMPLE 6

A 30/70 blend of PPE/injection grade polystyrene with 0.5% talc and fluorocarbon 12 blowing agent is run in a tandem extruder process through an annular sheet die at the following temperatures:

| | |
|---|---|
| Zone 1 | 330 degrees F. |
| Zone 2 | 445 " |
| Zone 3 | 458 " |
| Coupling Zone | 356 " |
| Zone 5 | 275 " |
| Zone 6 | 286 " |
| Adaptor Zone | 295 " |
| Die | 318 " |

Density is about 4 lb./cu. ft. Foam thickness is 40-60 mm. While stiffer than others, a good product is obtained. This is capable of being cut and rolled without difficulty.

EXAMPLE 7

A 30/70 blend of PPE/extrusion grade crystal polystyrene with 0.5% talc and chlorofluorocarbon 12 is run in a tadem extruder process through an annular sheet die at the following temperatures:

| | |
|---|---|
| Zone 1 | 360 degrees F. |
| Zone 2 | 446 " |
| Zone 3 | 456 " |
| Coupling Zone | 358 " |
| Zone 5 | 295 " |
| Zone 6 | 313 " |
| Adaptor Zone | 310 " |
| Die | 318 " |

Density is measured at 4 lb./cu. ft. Foam thickness is 40-60 mm. At these temperatures there were no problems encountered in running this material.

EXAMPLE 8

A composition comprising poly(2,6-dimethyl-1,4-phenylene ether) and rubber modified high impact polystyrene (NORYL ® FN 215) is run with 0.5% talc and chlorofluorocarbon 12 blowing agent in a tandem extruder process through an annular sheet die at the following temperatures:

| | |
|---|---|
| Zone 1 | 356 degrees F. |
| Zone 2 | 430 " |
| Zone 3 | 438 " |
| Coupling Zone | 357 " |
| Zone 5 | 275 " |
| Zone 6 | 288 " |
| Adaptor Zone | 275 " |
| Die | 290 " |

Density is measured to be 4 lb./cu. ft. Foam thickness is 40-60 mm. This material processes well and flexible.

EXAMPLE 9

A 30/70 blend of 0.46 dl/g PPE and polystryene containing 0.45% dioctylmaleate as a viscosity stabilizer and 0.4% nucleator is added to a 90 mm, 40 L/D single-screw extruder using chlorofluorocarbon 11 as a blowing agent and extruded through a slit die having a 2.5×160 mm opening. RPM was 34 and rate is about 100 kg/hr. pressure is 30 bar and the blowing agent rate was about 10.5 lb./hr. Temperature in the extruder follow:

| | |
|---|---|
| Zone 1 | 220 degrees F. |
| Zone 2 | 270 " |
| Zone 3 | 280 " |
| Zone 4 | 205 " |

| | |
|---|---|
| Zone 5 | 280 " |
| Inject Zone | 150 " |
| Zone 7 | 100 " |
| Zone 8 | 90 " |
| Zone 9 | 95 " |
| Zone 10 | 105 " |
| Zone 11 | 91 " |
| Zone 12 | 98 " |
| Zone 13 | 100 " |
| Die Melt Temp. | 160 " |

A good foam having a density of 2.1 lb./ft.$^3$ is obtained.

EXAMPLE 10

The primary extruder is a 60 mm co-rotating machine with a 30:1 L/D, and powered by a 150 HP DC drive at 120 rpm. The secondary extruder is a 90 mm 42:1 L/D machine with crossover from the primary positioned at about 12 L/D, giving an effective cooling length of 30 diameters. This unit is powered by a 125 HP AC Eddy current drive system. The secondary is oil cooled/heated in 3 zones with heating capabilities to 300 deg. C. The die used in this example is a basic polystyrene die. The body and lips are oil heated/cooled and the die gap is a maximum 2 mm by 280 mm wide. A 25/75 blend of PPE/polystyrene with 0.4% hydrocerol CF® as a nucleate is added under the following key processing parameters:

Blowing Agent: CFC 12 at 12.2%
Primary Discharge Temp.: 226° C.
Primary Discharge Press: 150 Bar
Secondary Melt Temp.: 134° C.
Secondary Discharge Press: 65 Bar
Rate: 80 kg/hr A good structural foam is obtained with the following properties:

Thickness: 1.5 in.
Density: 2.3 lb./cu. ft.$^3$
Cell size: 0.44 mm
Closed cell count: 95.7 percent
K value: 0.152
Compressive strength: 62 psi

EXAMPLE 11

The process of Example 10 is followed except that a 40/60 blend of PPE/polystyrene with 0.2% hydrocerol CF® is used and the primary screw speed was increased to 200 RPM. The following key processing parameters are employed:

Blowing Agent: CFC 12 at 11%
Primary Melt: 234° C.
Primary Pressure: 70 Bar
Secondary Melt: 145° C.
Secondary Press: 70 Bar
Rate: 80 kg/hr An excellent foamed structure is obtained.

Any patents and publications above-mentioned are incorporated herein by reference. The foregoing description will suggest many obvious variations of this invention to those skilled in the art. For example, instead of polyphenylene ether, poly(bisphenol A carbonate) or poly(1,4-butylene terephthalate can be used. Triphenyl phosphate or isopropyltriphenyl phosphate to provide 0.3% phosphorus content by weight can be included as flame retardant agents, or, instead, brominated polyphenylene ethers, and the like, to provide 1-2% bromide, or by weight 5-15% by weight of hydrated alumina can be included as flame retardant agent.

We claim:

1. A low density, high compressive strength extruded structural foamed article of manufacture comprising either an engineering thermoplastic resin alone, or an engineering thermoplastic resin in combination with an alkenyl aromatic polymer wherein said engineering thermoplastic resin comprises at least 20 weight percent of said combined resin, and a blowing agent having closed cell structure produced by the steps comprising
   (a) feeding the resin composition into an extruder;
   (b) melting and mixing the resin;
   (c) introducing a blowing agent that is essentially insoluble in the resin at room temperature but soluble in the melt into said extruder;
   (d) mixing the blowing agent with the resin in said extruder;
   (e) cooling the mixture, optionally in a second extruder; and
   (f) foaming the mixture through a die.

2. A foamed article as defined in claim 1 wherein the thermoplastic engineering resin comprises a polyphenylene ether resin.

3. A foamed article as defined in claim 2 wherein the thermoplastic engineering resin comprised poly(2,6-dimethyl-1,4-phenylene ether).

4. A foamed article as defined in claim 2 wherein said polyphenylene ether resin composition is comprised of about 20 to 90 parts by weight polyphenylene ether and correspondingly 80 to 10 parts alkenyl aromatic polymer per 100 parts by weight of combined resins.

5. A foamed article as defined in claim 2 wherein said polyphenylene ether resin is a homopolymer or copolymer comprised primarily of 2,6-dimethyl phenylene ether units and 2,3,6-trimethyl phenylene ether units and has an intrinsic viscosity of about 0.1 to 0.7 dl/gm as measured in chloroform at 25° C.

6. A foamed article as defined in claim 1 wherein the alkenyl aromatic resin is a homopolymer or copolymer comprised primarily of styrene and substituted styrene units.

7. A foamed article as defined in claim 7 wherein said alkenyl aromatic resin is crystal polystyrene.

8. A foamed article as defined in claim 2 wherein said polyphenylene ether resin composition is further comprised of a nucleating or a flame retarding agent.

9. A foamed article as defined in claim 1 wherein said blowing agent is present in an amount of about 3 to 15 weight percent based upon the weight of the resin composition.

10. A low density, high compressive strength extruded structural foamed article of manufacture comprising either an engineering thermoplastic resin alone, or an engineering thermoplastic resin in combination with an alkenyl aromatic polymer wherein said engineering thermoplastic resin comprises at least 20 weight percent of said combined resin, and a blowing agent having closed cell structure produced by the steps comprising
   (a) feeding the resin composition into an extruder;
   (b) melting and mixing the resin;
   (c) introducing a blowing agent that is essentially insoluble in the resin at room temperature but soluble in the melt wherein said blowing agent is an aliphatic hydrocarbon or chlorofluorocarbon which will vaporize at a temperature below the Tg of the resin composition into said extruder;

(d) mixing the blowing agent with the resin in said extruder;

(e) cooling the mixture, optionally in a second extruder; and (f) foaming the mixture through a die.

11. A foamed article as defined in claim 10 wherein the blowing agent comprises an aliphatic hydrocarbon selected from butane, pentane, isopentane, pentene, hexane, heptane or a mixture of any of the foregoing.

12. A foamed article as defined in claim 10 wherein the blowing agent is a chlorofluorocarbon selected from $CCl_3F$, $C_2Cl_3F_3$, $C_2ClF_5$, $CCl_2F_2$, $CHClF_2$ or $CClF_2\text{-}CClF_2$ or a mixture of any of the foregoing.

13. A foamed article as defined in claim 1 which comprises a foam insulation board.

14. A foamed insulation board as defined in claim 13 wherein the thickness is from about 35 to about 65 mm.

15. A foamed article as defined in claim 1 wherein the density is from about 1.0 to about 2.5 pounds per cubic foot.

16. A foamed article as defined in claim 15 wherein the compressive strength is from about 20 psi to about 100 psi.

17. A low density extruded structural foamed article comprising a polyphenylene ether/polystyrene resin composition comprising at least 20 weight percent of polyphenylene ether resin based on the weight of the combined resin and having a closed cell structure produced by the steps comprising:

(a) feeding the resin composition into an extruder;

(b) melting and mixing the resin composition;

(c) introducing a blowing agent which is essentially insoluble in the resin at room temperature but soluble in melt into said extruder;

(d) mixing the blowing agent with the resin in said extruder;

(e) cooling the mixture in a second extruder; and (f) foaming the mixture through a die, to produce a foamed article having a compressive strength of greater than about 20 psi.

18. A foamed article as defined in claim 17 wherein the compressive strength is greater than about 50 psi.

19. A foamed article comprising from about 20 to about 99 parts by weight of a polyphenylene ether resin and from about 80 to about 1 parts by weight of a styrene resin, said article having a closed cell structure, a density of below about 20 lb./ft.$^3$ and a compressive strength of greater than about 20 psi.

20. A foamed article as defined in claim 19 wherein the compressive strength is greater than about 50 psi.

21. A foamed article as defined in claim 19 which also includes an effective amount of flame retardant additive.

22. A foamed article as defined in claim 21 wherein the flame retardant is selected from an organophosphate; a brominated aromatic compound, alone, or combined with an antimony synergist, hydrated alumina, or a mixture of any of the foregoing.

23. A low density extruded structural foamed article comprising a polyphenylene ether/polystyrene resin composition comprising at least 20 weight percent polyphenylene ether resin based on the weight of the combined resin and having a closed cell structure produced by the steps comprising:

(a) feeding the resin composition into an extruder;

(b) melting and mixing the resin composition;

(c) introducing a blowing agent which is essentially insoluble in the resin at room temperature but soluble in the melt wherein said blowing agent is an aliphatic hydrocarbon or chlorofluorocarbon which will vaporize at a temperature below the Tg of the resin composition into said extruder;

(d) mixing the blowing agent with the resin in said extruder;

(e) cooling the mixture in a second extruder; and (f) foaming the mixture through a die, to produce a foamed article having a compressive strength of greater than about 20 psi.

* * * * *